United States Patent [19]
McNeece

[11] 3,724,084
[45] Apr. 3, 1973

[54] ALIGNMENT APPARATUS
[76] Inventor: Leonard D. McNeece, 1913 Saint Charles Road, Maywood, Ill.
[22] Filed: Sept. 28, 1970
[21] Appl. No.: 75,941

[52] U.S. Cl. ..................33/185 R, 33/174 L, 33/201
[51] Int. Cl. ............................................B27g 23/00
[58] Field of Search.........33/185 R, 181 R, 174 PA, 174 L, 33/201

[56] References Cited

UNITED STATES PATENTS

| 3,102,344 | 9/1963 | Herman | 33/174 PA |
| 2,417,148 | 3/1947 | Wright | 33/174 L |
| 2,858,615 | 11/1958 | Aller | 33/174 PA |
| 2,977,533 | 3/1961 | Savage | 33/174 PA |

FOREIGN PATENTS OR APPLICATIONS 1,491,418   7/1967   France ...............................33/174 L Primary Examiner—William D. Martin, Jr.
Attorney—John Todd, Walter I. Jones, Philip E. Parker, Gordon Needleman, James R. O'Connor and Joseph Y. Houghton

[57] ABSTRACT

An apparatus comprising a probe element for aligning and for checking the alignment of a tool, or the like, with respect to a work piece. The tool is moved into engagement with the probe element thereby activating indicators which are provided on the probe to provide a manifestation of alignment or mis-alignment. Once the tool, or other element, has been aligned it usually will maintain this condition during a normal period of use.

1 Claim, 4 Drawing Figures

PATENTED APR 3 1973　　　　　　　　　3,724,084

Inventor
Leonard D. McNeece
By John Jodd
Attorney

ALIGNMENT APPARATUS

The present invention relates to a tool aligning apparatus and more particularly to an apparatus adapted for alignment of a tool, or the like, with respect to a work piece.

Alignment device for many different purposes are commonly known in the art. Some such devices are wholly mechanical or electrical in nature, depending on the article to be aligned. In many cases the article itself does not contribute to, or constitute a part of, the aligning apparatus. A few devices, such as the type employed in the present invention, use the article being aligned as a reference and, as such, constitute a part of the alignment apparatus.

The particular device with which the apparatus of the present invention was employed for experimental purposes is an electrical discharge machining device (EDM). Such devices remove material by the action of electrical energy in continuous erosion of small portions of the material from the main body of material. The energy relationship in such machines is controlled so that the removal of material is a function of the contour of the tool used in the process. By adjusting the energy relationship to define a potential between the tool and the material, some material can be removed to any desired depth within a predetermined range. The work generally is immersed in an oil bath, or the like, which is circulated constantly to provide means for carrying away particles removed from the material.

Electrical and discharge machining devices frequently are used for machining very hard materials which are otherwise very difficult to work with. Such devices provide an economical, fast cutting means for these hard materials.

There are a number of different types of EDM machines but all use some type of electrode as a work tool. The electrodes are not made of the same material one usually finds for drills and the like which are very rigid and made to rigid specifications. Some electrodes are very small in diameter and it is not uncommon to find that the electrodes are not defined along a common axis. That is, axial misalignment often occurs. Also, it is difficult to exactly vertically align the electrode when mounting it in the machine. Accordingly, some means must be provided for alignment of the tool or electrode so that the work to be performed will be performed in a predictable and reproduceable manner.

Some devices which have been developed for alignment purposes involve the use of a mechanically deflected probe. The probe may be mounted on a vertically extending shaft and moved against the tool until a standard reference deflection is observed. The probe then is moved about the tool until the user is reasonably assured that the tool is vertical with respect to the work piece. There are many deficiencies in such methods of alignment. One problem is that the tool itself is usually very small in diameter and may be deflected to some extent by the pressure of the probe acting against it. Accordingly, when the probe is removed the tool restores itself to a relaxed state which is out of alignment with the work piece. Also, devices of this type generally are manually handled and there may be some problem attendant with manual alignment of the probe with respect to the tool and work piece.

I have developed an alignment device for use with electrodes of electrical discharge machines, or the like, which provides a means for checking the linearity and alignment of the electrode The tool can be set up in a very short time and used for subsequent electrodes to provide a visual or other, indication of the alignment or misalignment of a tool with respect to the work piece. The present invention can readily be used with conventional hand fed electrical discharge machines or with automatic electrode feeding devices.

One other important feature of the alignment device which I have developed is that it may be used to provide a visual manifestation of the condition of a surface. That is, the alignment device may be defined in a planar surface or may be provided with any predetermined configuration desired. The surface then to be measured is compared with the standard or reference surface of the alignment or measuring device and any degree of irregularity relating to a departure of the surface condition from the predetermined contour of the alignment device will be indicated.

It is, accordingly, a primary object of the present invention to provide an improved alignment device.

A further object of the present invention resides in the provision of an indicating means which will automatically show the condition of a surface.

Another object of the present invention resides in the provision of an improved alignment apparatus to linearly align a work tool to any desired angle with respect to a work piece.

Additional objects of the present invention reside in the provision of an alignment device for use with machining tools using electrical energy to remove material from the piece being worked upon wherein the aligning device is brought up to a fixed tool to automatically check tool alignment and which provides for flexibility in machining operations by being easily adaptable to either fixed or moveable work tools; and wherein the device is easily set up for use, is economical to manufacture and use; is durable in use; and which provides for simple and automatic indication of alignment or misalignment.

The novel features which I believe to be characteristic of my invention are set forth with particularity in the appended claims. My invention, however, taken together with further objects and advantages thereof will best be understood by reference to the following description taken in connection with the accompanying drawings, in which:

Figure 1:
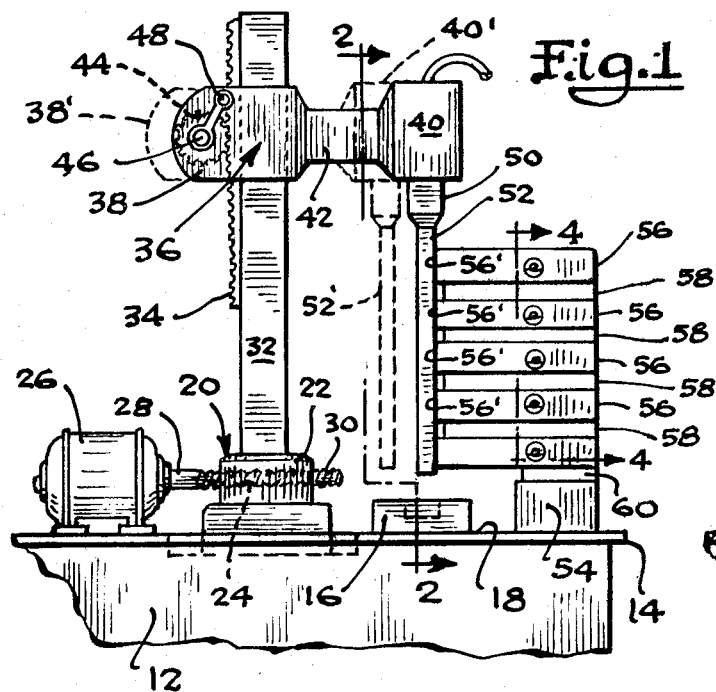
FIG. 1 is a side elevation of the apparatus of the present invention showing the alignment device, indicator means, work tool and a portion of the electrical discharge machine with which the device may be utilized.
Figure 2:
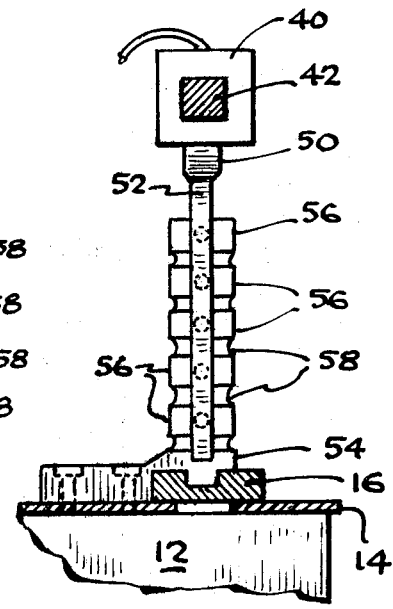
FIG. 2 is a view, partly in section, taken along lines 2—2 of FIG. 1 showing the relationship of the alignment device to the work tool in one position of said device with respect to the work tool.

Referring more particularly now to the drawings, and specifically to FIG. 1 of the drawings, the apparatus herein is indicated generally at 10. The device, as indicated above, may be used in conjunction with an electrical discharge machine of the type commonly known in the art. The function of such machines is described generally above but contemplates removal of material from an object to define a predetermined contour within the object as desired by the user. The device basically may include means for supplying electrical power to an electrode or work tool, to be described hereinbelow. An alignment device may be utilized with the machine and may be provided in any number of different forms depending upon the requirement of the user and the characteristics of the design.

The apparatus includes a support base 12 within the work area of the apparatus. The support base 12 defines a top 14 which serves as the work table associated with the electrical discharge machine. It should be noted that the electrical discharge machine is not specifically shown herein and does not form a part of the present invention.

The machine support top 14 is adapted to receive and support the work piece or element to be machined 16 within a work area 18 defined on the top 14. A guide element 20 is slideably mounted on and with respect to the top 14 and is adapted to be moved therealong toward and away from the work piece 16. The guide element 20 is defined by a general support block 22 within which a worm race 24 is defined. An electric motor 26 is provided for use with the apparatus. The output shaft 28 of the electric motor 26 defines a worm gear having a threaded portion 30 along the axial extension thereof. The work gear extends into the worm race 24 of the guide element 20, as shown schematically in FIG. 1 of the drawings. The motor 26 is rigidly secured to the table 14 of the base 12 and is immoveable with respect to said table 14. Accordingly, rotation of the output shaft 28 of the motor 26 will cause the threaded worm portion 30 of the output shaft of the motor to rotate within the work race 24 to cause the guide element 20 to move toward or away from the motor 26 in sliding action along the tab 14 of the apparatus.

A vertical guide member 32 is rigidly secured to the guide element 20 and extends normally upwardly therefrom. A rack gear 34 is secured to the vertical guide member along one side thereof — the left side as illustrated in the drawing of FIG. 1.

A housing, indicated generally at 36, is mounted over and supported on the vertical guide member 32. The housing 36 is defined by a pinion housing section 38, a work tool or electrode housing section 40 and an interconnecting section 42 extending between sections 38 and 40 to support the section 40 with respect to the section 38.

A pinion gear 44 is rotatably mounted within the pinion housing section 38 of the housing 36 and is adapted to engage the rack gear 34 when the housing 36 is mounted over the vertical guide 32. The pinion gear 44 is rotatably mounted within the housing 38 on a shaft 46 which extends into appropriate bushing elements (not illustrated) in the side walls of the pinion housing section 38. A crank or handle 48 is operatively associated with the pinion gear 44 so that rotation of the handle 48 will result in a similar rotation of the pinion gear 44 on the shaft 46 on which said gear is mounted. It can readily be seen that rotation of the pinion gear 44 will cause successive tooth elements of said gear to engage successive tooth elements of the rack gear 34 to move the housing 36 vertically upwardly or downwardly along the vertical guide element 32. In this manner the position of the housing 36 may be adjusted at the will of the user. It should be noted also, that automatic means may be provided for adjustment of the housing 36, as desired.

A tool extension member 50 is operatively associated with the work tool or electrode housing section 40 of the apparatus and is adapted to receive and securely hold the electrode 52.

The alignment device, indicated generally at 10, may be supported on a suitable element or support member 54 which, in turn, is supported on the table 14 of the support base 12. It should be noted that the element 54 or any other means for supporting the alignment device 10, must have a top surface which is carefully defined in a parallel relationship to the top surface of the table 14 of the apparatus. In this manner, the top of the support element 54 is merely an extension of the top surface of the table 14. It should also be noted that the alignment device 10 may have a suitable support means provided integrally therewith which would be adapted to holding the device in a predetermined relation with respect to the work tool or electrode 52 and the use of an auxiliary support means, such as the element 54, may not be required.

The alignment device 10 is defined by plurality of electrically conductive elements 56 positioned in a stacked array and being separated by non-conductive members 58 so that a conductive path is not defined between elements. It can readily be seen that the insulating elements 58 interrupt the electrical path between elements and are provided for the reasons set forth hereinbelow.

One face 56' is carefully defined in a predetermined configuration is used as the reference face of the elements 56 of the alignment device 10. It is critical to satisfactory operation of the device that the faces 56' of the elements 56 of the alignment device 10 be aligned in a carefully predetermined fashion. For example, in use as an alignment device, the faces 56' must carefully be arranged and defined in a flat vertical surface configuration so that absolute vertical continuity is defined from face-to-face and between faces along the array of elements 56 within the device 10. In this manner the vertical characteristic of the tool may be determined. The operation of the device will be described in detail hereinbelow but it is important to note here that strict vertical alignment of the faces 56' must be observed in construction of the alignment apparatus 10. If, however, the device 10 is to be used to determinee character of a predetermine surface contour, then the faces 56' of the apparatus may be arranged in any desired fashion to be used as a means for gauging the characteristic of the surface to be measured. For example, the face 56' may be arranged in the shape of an arc to determine the characteristics of a particular arc surface to be measured. Also, the faces 56' may be defined in the form of an an angle or of some other irregular contour to be used as a reference for measurement of other faces to be machined or formed in this manner.

The electrically conductive elements 56 may be defined as probe elements of the apparatus and they are secured together as a unit with insulators interposed between conductive probe elements 56 and are mounted on a suitable support face 60. The assembly of conductive probe elements 56 and insulating members 58 may be held together on the support base 60 by a clamp element or any other suitable assembling device or means (not shown).

The electrode 52 is secured to the lower portion of the work tool or electrode housing section 40 for mounting of the electrode with respect to said housing. The electrode 52 may be mounted within a suitable tool extension member 62 which is operatively disposed in the housing section 40 so that the desired electrode operation may be realized. The tool extension member 62 is provided as a means for easy insertion and removal of the electrode 52 to permit easy replacement during use of the apparatus.

Figure 3:
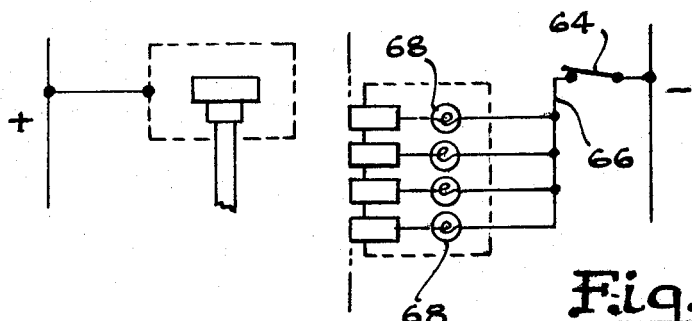
FIG. 3 is a schematic electrical diagram of the system of the alignment device and associated apparatus of the present invention.
Figure 4:
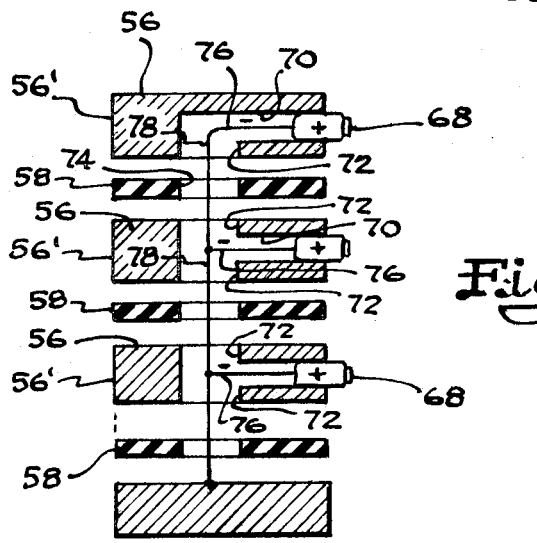
FIG. 4 is a view, in section, of the alignment device taken along lines 4—4 of FIG. 1.

The electrical circuit and control means associated with the apparatus and the operation of the apparatus may best be understood by reference to the schematic illustration of FIG. 3 and the sectional drawing of FIG. 4 of the apparatus.

The schematic shown is a conventional illustration of the circuit connected across a suitable power source for the apparatus. In the device developed and utilized by me the circuit is defined within the electrical discharge machine and the 6 volt source available there is suitable for use with the apparatus and is one that I have employed in use of the apparatus in the alignment of tools as described herein.

It should be noted, however, that where the alignment device is not used with an electrode discharge machine it will be necessary to use a separate source of electrical energy to provide means for operation of the device as described herein. However, the particular source of electrical energy forms no part of the present invention but, rather, is simply a convenient means for defining a vehicle for manifestation of the character of the surface. Other suitable indicia may be utilized equally well but the means specifically set forth herein is one that I employed and one that is quite suitable for the purpose. This does not mean that I preclude other suitable indicia which may be adapted for use with my device.

Whether the alignment device then is used with an electrical discharge machine, as described herein, or as a surface reference for some other purpose, the device will be connected across a power source, unless some other suitable indicia is provided to set forth a manifestation of the character of the surface to be measured. If electrical indicating means are used, however, the device will be associated with an on-off switch 64 which may be utilized to disable the circuit, as desired. One side of the switch 64 is connected to one side of the power supply, as illustrated schematically in FIG. 3, while the other side of the switch 64 is connected through a lead 66 to one side of the indicators 68 used in conjunction with the device 10.

The indicators 68 in the particular device which I developed for experimental purposes in determining the characteristics and operation of the invention may be lightbulbs operated on low voltage (e.g. 6 volts). The lightbulbs, of course, will not be illuminated when they are not connected across the power supply and will be illuminated when the circuit through the filament of the bulbs 68 is completed. Accordingly, circuit continuity through the conducting block, as described below, will define a means for illuminating the bulbs 68 and for indicating the character of the surface to be measured or the tool to be aligned, as described hereinbelow.

The functional relationship of the bulbs to the device 10 is seen more clearly in the illustration of FIG. 4 of the drawings. As shown in FIG. 4 the electrically conductive elements or probes 56 are each provided with an opening 70 extending from one face thereof into the center portion of the probe 56. Another opening 72 extends through the probe in a direction substantially normal to the axial direction of the opening 70 to intersect the opening 70 and provide a continuous open path from the opening 70 to another face of the block, as illustrated in FIG. 4. The openings 72 of the successive electrically conductive elements or probes 56 are in axially aligned relation and define a continuous path along the device 10 in combination with mating openings 74 defined in the insulating elements 58 of the device 10. It can be seen from FIG. 4 that one side of the bulbs 68 is electrically connected to a lead 76 which extends along the openings 70 and is joined to a common conductor extending through the openings 72-74. The common conductor 78 extends from the leads 76 to the support base 60 for the device 10. In this manner one side of the bulbs 68 is electrically connected to ground as defined by the support base 60. The other side of the filament associated with the bulbs 68 will each be connected to a separate probe element 56 by electrical engagement of the electrically conductive wall of the bulb elements 68 with the electrically conductive probe 56. This is accomplished by engagement of the bulb base 68 with the inner wall of the opening 70.

It will be noted from the above description that the electrical circuit through the filament of the bulbs 68 is defined by the passage of current along the probe 56, through the metal base of the bulb 68, through the filament 68 and through the base to the lead 76 electrically connected to the bottom of the base and the other end of the filament in the bulb 68. The lead 76, as noted above, is electrically connected to ground to complete the circuits. Accordingly, when an electric current passes through the probe 56 the filament of the bulb 68 will be lighted, assuming that the switch 64 is closed to complete the circuit.

In operation, the device 10 is moved on a surface parallel to the top 14 of the electrical discharge machining apparatus to a point where at least one of the faces 56' of the probes 56 of the device 10 will engage the vertical surface of the electrode 52. The previous description, of course, defines a use of the device 10 as an alignment tool for electrodes, as noted hereinabove.

In the device I developed for experimental purposes and which I have used in the alignment of electrodes on electrical discharge machines I utilize 4 probe elements 56. The faces 56' of these elements are in carefully aligned relation so that any surface contacting all 4 faces 56' of the probes must be in a straight line along at least that much of its length or dimention. The total length defined along the assembled probes 56 may be varied by varying the dimension of the probes themselves and also by varying the thickness of the insulators 58 disposed between the probes 56. Also, the length of the entire assembly may be varied by adding more probe elements or by utilizing fewer elements, as desired.

With the electrode or work tool inserted in the tool extension member 50 of the electrode housing section 40 the alignment device 10 is slowly moved toward the electrode 52 until contact is made therewith. The electrical circuit for providing a visual manifestation of contact or non-contact of the probes 56 with the surface of electrode 52 is provided by attaching one electrical lead from the power source to the electrode housing section 40, or some other suitable point of attachment in that area. The other lead from the power source may be connected to the support base for the device 10. It should be noted that the housing 40, tool extension member 50, and electrode 52 are electrically conductive, as are the probes 56 of the alignment device 10.

When the face 56' of any electrode 56 of the alignment device 10 contacts the electrode 52 the circuit will be completed from the electrode through the probe 56, through the filament of the bulb 68 and along the leads 76 and 78 to the support base 60 and the other side of the power source. Accordingly, the circuit is completed through the filament to illuminate the filament and provide a visual manifestation of the fact that the probe 56 is in direct contact with the electrode 52 of the apparatus. It can readily be seen, for example, that if all 4 bulbs 68 are illuminated that all 4 electrodes of the assembly (in my specific example) will be in contact with the electrode 52. If the faces 56' of the 4 electrodes 56 are exactly vertically aligned, then it must follow that the electrode 52 will similarly be exactly vertically aligned with respect to the base of the work area for the apparatus.

If only the top bulb is illuminated, then a visual indication is provided that the electrode 52 is misaligned in a manner that causes the electrode to tilt away from the bottom probes of the device 10. Accordingly, an appropriate adjustment may be made until all four bulbs are illuminated which will provide a visual indication of the fact that the electrode 52 is vertically aligned with the reference surface.

The alignment device 10 then may be rotated through 90° and brought into engagement again with the electrode 52 to determine whether the electrode is oriented vertically in all directions. Once vertical alignment is achieved in a direction normal to the first direction of measurement the user is assured of axial vertical alignment of the tool with respect to the work piece and work area.

It can readily be seen that the alignment device 10, as described herein, may equally well be used for determining the flat character of a surface of a conducting material. In such instance for example, one side of the power source would be connected to the surface to be measured and the other side of the power source would again be connected to the support base 60 of the device 10. The device then would be placed on the surface to be measured with the faces 56' in contact with the surface. The device then could be moved about the surface to provide a visual manifestation of the flatness of any portion of the surface. If each of the probe faces 56' contact the surface in a position of the device 10 then all bulbs will be illuminated and a visual indication will be provided with regard to the flatness of the surface being measured.

Still another use for the device 10, as described herein, would involve a determination of whether one element is normally positioned with respect to another. In such instance the device 10 would be placed on one surface of the two elements to be measured with the base 60 insulated from said surface by a suitable insulating element. The device then would be moved toward the other "vertically aligned" member of the pair to be measured. The circuit would be defined by placing one side of the power source on the "vertically aligned" element to be measured and connecting the other side of the power supply to the base 60 of the device 10. The device then is moved to engagement with the "vertically aligned" surface of the pair until the faces 56' contact said member. If all bulbs illuminate then the user is given a visual indication of the alignment of the vertical member with respect to the horizontal.

It readily be seen that any desired surface configuration or contour may be measured by simply providing an appropriate mating contour on the faces 56' of the probes 56. The bulbs may be used in the same manner as indicated herein to provide a visual indication of the match or mis-match of the surface with respect to the device 10.

While I have shown and described the specific embodiment of the present invention, it will, of course, be understood that other modifications and alternative constructions may be used without departing from the true spirit and scope of this invention. I therefore intend by the appended claims to cover all such modifications and alternative constructions as fall their true spirit and acope.

What I intend to secure by United States Letters Patent, is:

1. A device for determining the angle of direction of a tool with respect to a work piece, said device comprising a base piece, said base piece carrying a plurality of independent probe members disposed in aligned relation and immovable relative to said base piece and each other, said probe members being in the form of conductive blocks, said blocks being connected across a power source which flows through said tool, each of said blocks being of rectangular shape and providing a flat probe area at one of its longitudinal ends and an opening at an opposite end, said flat probe areas being disposed in a plane corresponding to the desired angle of said tool relative to said work piece, insulating members disposed between said blocks to insulate said blocks one from another, said blocks and said insulating members having aligned interior openings for receiving a conductor, said openings in the ends of said blocks intersecting said interior openings, a light bulb carried by each of said blocks and disposed in said opening in the end of said block, each of said light bulbs having one lead in electrical engagement with said block and a second lead connected to ground by a conductor extending through said interior openings of said blocks and said insulating members, each of said bulbs becoming lit when said probe area of the block with which it is electrically engaged contacts said tool.

* * * * *